United States Patent [19]
Chen

[11] Patent Number: 6,109,124
[45] Date of Patent: Aug. 29, 2000

[54] HIGH-THRUST CLUTCH-TYPE AUTOMOTIVE ELECTRIC LOCK

[76] Inventor: Tse-Hsing Chen, No. 37, Lane 136, Chung Hsing N. St., San Chung, Taipei County, Taiwan

[21] Appl. No.: 09/169,944

[22] Filed: Oct. 13, 1998

[51] Int. Cl.[7] .............................. F16H 25/20; F16D 13/14
[52] U.S. Cl. ........................ 74/89.15; 74/625; 192/54.5; 192/76
[58] Field of Search .................................. 74/89.15, 625; 192/54.5, 76

[56] References Cited

U.S. PATENT DOCUMENTS

| | | | |
|---|---|---|---|
| 4,645,050 | 2/1987 | Ingenhoven | 192/78 |
| 4,850,466 | 7/1989 | Rogakos et al. | 192/78 |
| 4,903,535 | 2/1990 | Kikuta et al. | 74/89.15 |
| 4,966,266 | 10/1990 | Yamada et al. | 74/625 |
| 5,086,900 | 2/1992 | Kikuta et al. | 74/89.15 |

FOREIGN PATENT DOCUMENTS 10-175437  6/1998  Japan .

*Primary Examiner*—David A. Bucci
*Assistant Examiner*—William C Joyce
*Attorney, Agent, or Firm*—Dougherty & Troxell

[57] ABSTRACT

Disclosed is a high-thrust clutch-type automotive electric lock which uses a motor to sequentially rotate a primary gear connected with a clutch assembly, a secondary gear, and a worm connected to the secondary gear, so that a push rod associated with the worm is guided by the worm to move forward or backward and thereby unlocks or locks an automobile door. The clutch assembly and the motor are in a loose connection relation when the motor is not started and no counter electromotive resistance would exist when a key is used to open the automobile door. Therefore, the torque output by the motor can be highly amplified through a big gear ratio of the secondary gear to the primary gear without the problem of counter electromotive resistance.

1 Claim, 6 Drawing Sheets

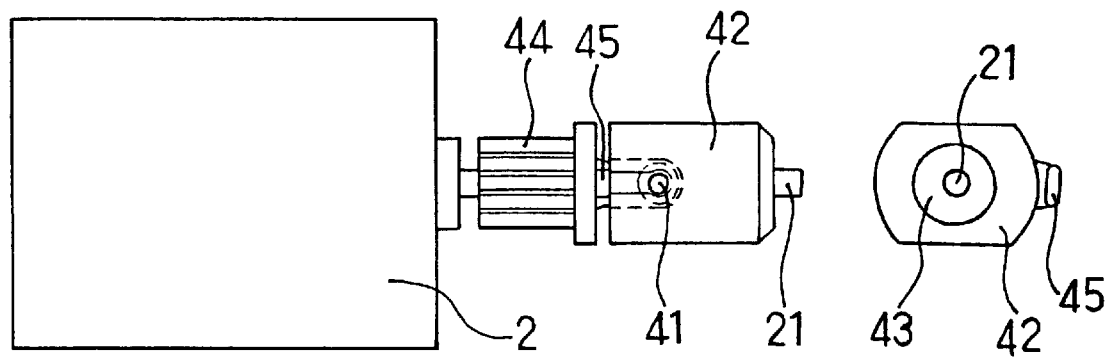
FIG.11  FIG.12
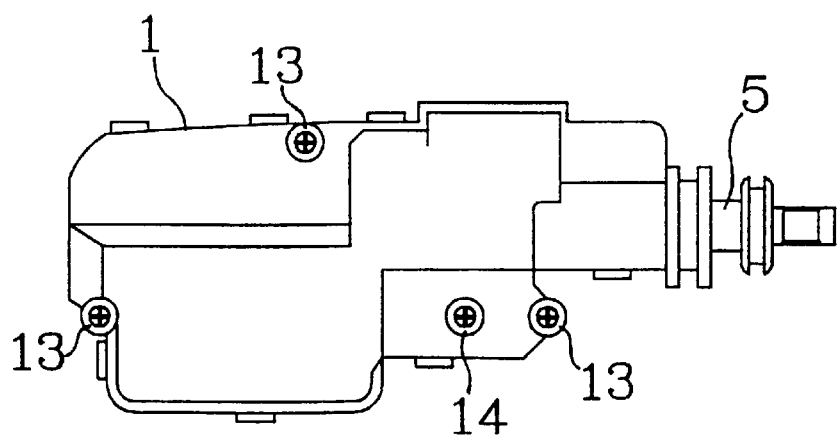
FIG.13

HIGH-THRUST CLUTCH-TYPE AUTOMOTIVE ELECTRIC LOCK

BACKGROUND OF THE INVENTION

The present invention relates to an automotive electric lock, and more particularly to a high-thrust clutch-type automotive electric lock with which sufficient torque is output while no counter electromotive force will be produced to form a resistance during unlocking the lock with a key.

It is known that most conventional automotive electric locks are driven directly through gears. That is, a torque output by a motor rotating at high speed is amplified through a high gear ratio to reduce the turns of rotation of a reduction gear. The reduction gear directly moves a push rod that in turn moves an external mechanical door lock connecting rod to an open or close position, so as to unlock or lock the electric door lock. To increase the torque, it is a common way to increase the gear ratio. As a result, a counter electromotive force is generated when the motor rotates. The larger the gear ratio is, the bigger the counter electromotive force is. When a key is used to unlock or lock a door, it might be bent or broken by a resistance produced by the big counter electromotive force. FIG. 1 illustrates a conventional automotive electric lock designed to solve the problem of resistance produced by the counter electromotive force. According to the mechanical principle employed in the automotive electric lock of FIG. 1, a worm (W) guides a push block (A) to move forward or backward along it in order to pull a push rod (D). When the push rod (D) is pulled to a dead point, a front end (A') of the push block (A) pushes a corresponding push point (D') on the push rod (D) outward to reach the right side of the point (D'). At this point, the push rod (D) can be pushed leftward without any resistance. With this arrangement, some power is consumed for the point (A') to push the point (A') away and therefore results in decreased power output. Moreover, the elasticity of point (D') also results in reduced power output.

SUMMARY OF THE INVENTION

It is therefore a primary object of the present invention to provide a high-thrust, clutch-type automotive electric lock that generates sufficient torque while no counter electromotive force will be produced to form a resistance during unlocking or locking automotive doors with a key.

Another object of the present invention is to provide an improved automotive electric lock having an easy-mount casing that is adaptable to all types of automobiles.

To achieve the above and other objects, the present invention mainly includes a casing in which a motor is mounted to sequentially rotate a primary gear connected to a clutch assembly, a secondary gear meshing with the primary gear, and a worm connected to the secondary gear, so that a push rod associated with the worm is guided by the worm to move forward or backward and thereby unlocks or locks a door of the automobile. In an embodiment of the present invention, the clutch assembly includes a cylindrical housing mounted around a rotating shaft of the motor with the primary gear integrally connected to one end of the housing and loosely mounted around the rotating shaft, a deformable elastic member mounted in and around the housing to define an expandable through hole for the rotating shaft to extend therethrough, at least one pair of flexible members disposed in the expandable hole of the elastic member, and a rotational block fixedly mounted around the rotating shaft in the expandable hole of the elastic member and pressing the flexible members against the elastic member. When the motor rotates, the rotational block also rotates to compress the elastic member and cause the latter to tightly contact with the housing, causing the housing and accordingly the primary gear to rotate at the same time. In another embodiment, the clutch assembly includes a housing having a copper block integrally set in one end thereof during injection molding. The copper block is tightly connected to and around the rotating shaft of the motor. The housing defines a chamber in which projecting rods fixed in place by springs are disposed. The primary gear has a push bar connected thereto and is loosely mounted around the rotating shaft between the motor and the clutch housing. When the motor rotates, the housing also rotates to throw the projecting rods outward with a centrifugal force larger than the tension of the springs. The thrown out projecting rods contact with the gear push bar and thereby push the primary gear to rotate. In either embodiment, the clutch and the motor are in a loose connection relation when the motor is not started and no resistance would exist when a key is used to open the automobile door. Therefore, the torque output by the motor can be highly amplified through a big gear ratio of the secondary gear to the primary gear without the problem of counter electromotive resistance.

BRIEF DESCRIPTION OF THE DRAWINGS

The above and other objects and the features and effects of the present invention can be best understood by referring to the following detailed description of the preferred embodiments and the accompanying drawings, wherein FIG. 1 schematically shows the structure of a conventional automotive electric lock;

FIG. 11 is a bottom plan view of FIG. 8;

FIG. 12 is a front plan view of FIG. 11; and

FIG. 13 exemplifies provision of fastening means on the casing of the present invention to lock two halves of the casing together.

DETAILED DESCRIPTION OF THE PREFERRED EMBODIMENTS

Figure 1:
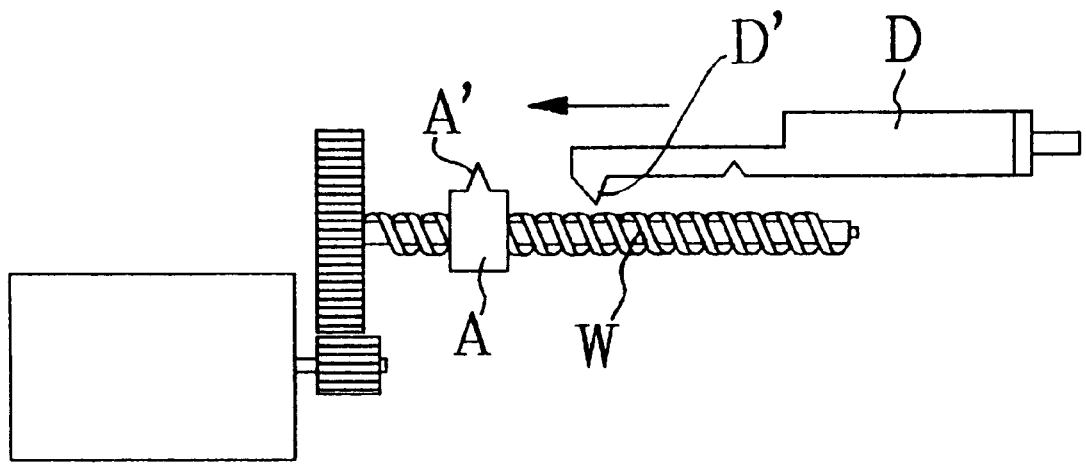

Please refer to FIGS. 2 to 5, in which a high-thrust, clutch-type automotive electric lock according to the present invention is shown. The automotive electric lock includes a casing 1 in which a motor 2 is mounted to drive a primary gear 35 connected to a clutch assembly 3 for the primary gear 35 to rotate a secondary gear 36, so that a worm 37 connected to the secondary gear 36 rotates to guide a push rod 5 to move forward or backward.

The clutch assembly 3 includes a cylindrical housing 31 mounted on and around a rotating shaft 21 of the motor 2. The primary gear 35 is provided at one end of the housing 31 facing the motor 2 to loosely surround the rotating shaft 21. An elastic member 32 made of elastomer or similar material is put in and around the cylindrical housing 31. Two inward folding portions 322 are symmetrically provided on two diametrically opposite sides of the elastic member 32. When a force is applied to the folding portions 322, they may deform to stretch outward. The elastic member 32 defines an expandable hole 321 longitudinally extending the length of the elastic member 32 for the rotating shaft 21 of the motor 2 to extend therethrough. The expandable hole 321 also has a generally rectangular cross section. At least one pair of flexible members 33 made of L-shaped thin metal sheets are disposed in the expandable hole 321 of the elastic member 32 to face each other. A rotational block 34 in the form of a long copper column having square cross section is located in the expandable hole 321 and fixedly mounted on and around the rotating shaft 21 of the motor 2. The rotational block 34 presses the flexible members 33 against the elastic member 32 to stop them from moving.

Figure 3:
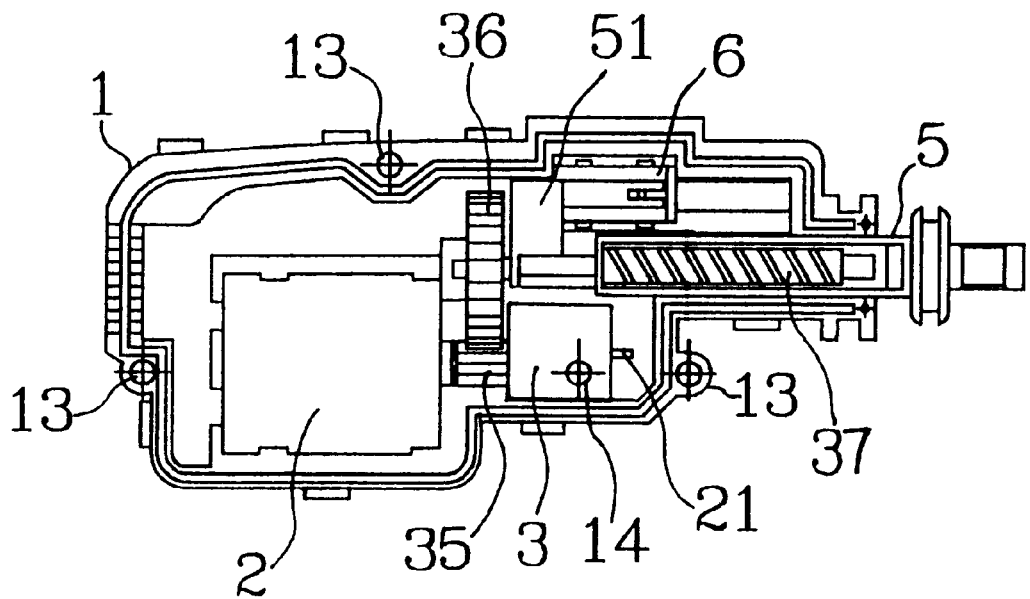
FIG. 3 is a plan view of an assembled clutch-type automotive electric lock of FIG. 2.
Figure 4:
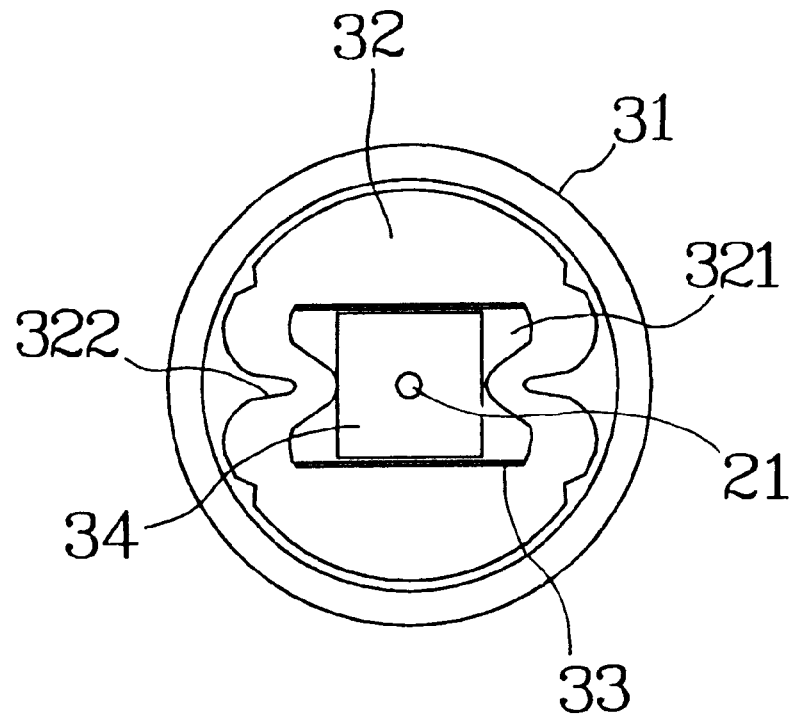
FIG. 4 is a front plan view showing an internal structure of the clutch employed in the present invention.
Figure 5:
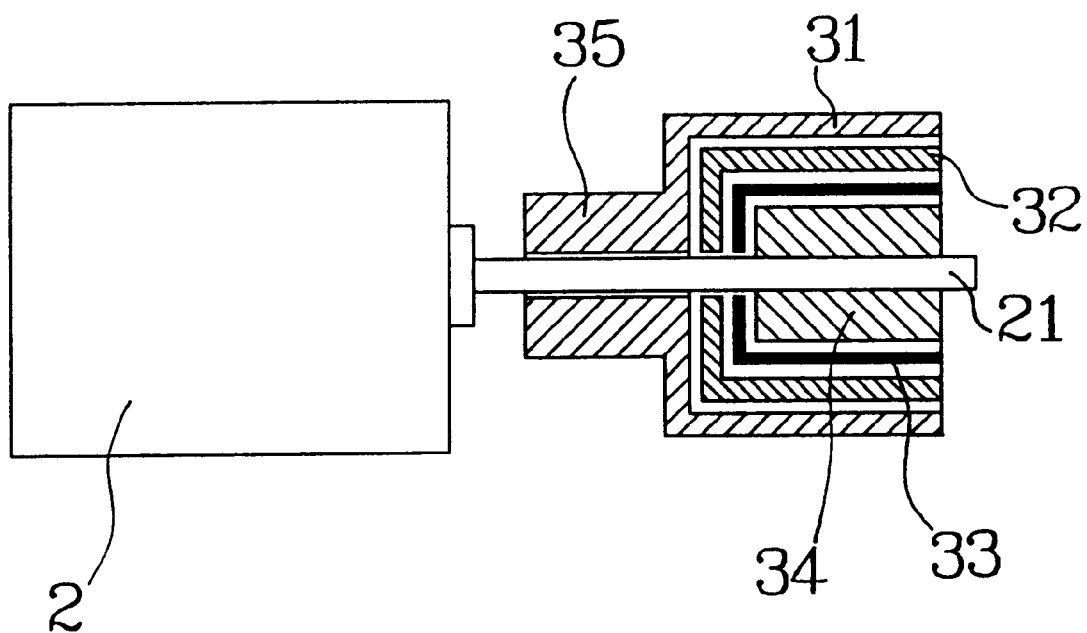
FIG. 5 is a partially sectional view showing the clutch of the present invention mounted around a motor rotating shaft.

As shown in FIGS. 3 and 4, the rotational block 34 is normally in a still state. Due to the restoring force of the flexible members 33 and the elastic member 32, the rotational block 34 in this still state allows the primary gear 35 to loosely mount around the rotating shaft 21. Therefore, when a key is used to unlock the door in this state, the key would absolutely not become bent or broken due to a counter electromotive resistance caused by an amplified torque as it would usually occur in conventional automotive electric locks.

Figure 6:
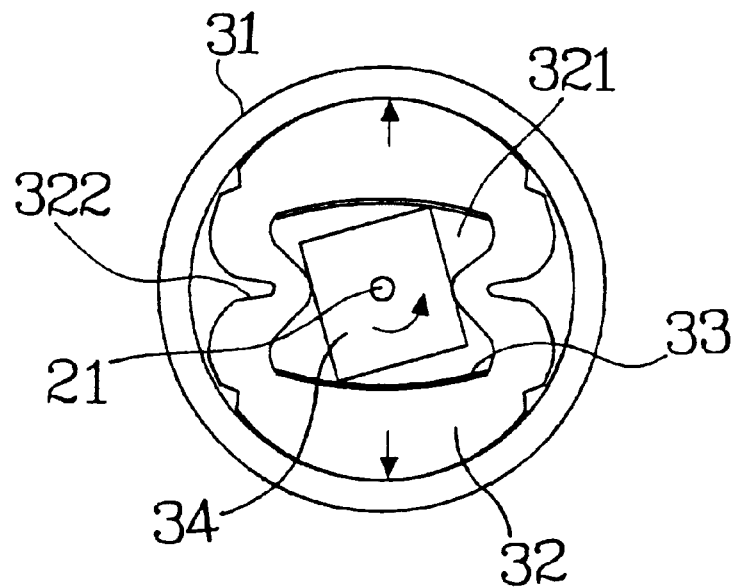
FIG. 6 illustrates the operation of the clutch of the present invention.

On the other hand, as shown in FIGS. 3 and 6, when the motor 2 is started, the rotational block 34 fixedly mounted around the rotating shaft 21 of the motor 2 in a tight fit relation rotates at the same time. The rotating block 34 compresses and outward bends the flexible members 33 located at two sides of the block 34 and accordingly causes the elastic member 32 outside the rotational block 34 and the flexible members 33 to evenly tension outwardly to directly tightly press against an inner wall of the cylindrical housing 31 of the clutch assembly 3. Such outward compressive force applied by the rotational block 34 against the cylindrical housing 31 via the elastic member 32 is so strong that it ensures the housing 31 to rotate while the motor 2 operates. This means the primary gear 35 provided at one end of the cylindrical housing 31 also turns to rotate the secondary gear 36 that meshes with the primary gear 35. The big ratio of number of teeth of the secondary gear 36 to the primary gear 35 sufficiently amplifies the torque output by the motor 2 to effectively turn the worm 37 connected to the secondary gear 36, and accordingly to guide the push rod 5 to move forward or backward along the worm 37. Since no counter electromotive resistance would be generated during the above whole process, the gear ratio can be maximized to achieve very big torque output.

FIGS. 7 to 12 illustrate another embodiment of the present invention in which a clutch assembly 4 employing a centrifugal clutch is included. In this embodiment, like elements will be denoted by the same reference numerals. Please particularly refer to FIGS. 8 and 9, in which the motor 2 is not powered and is in a still state. The clutch assembly 4 includes a housing 42 defining a projecting rod chamber. Projecting rods 41 are disposed in the projecting rod chamber with springs 412 put around the rods 41 to fix the rods 41 in place. When the housing 42 is injection molded from plastic material, a copper block 43 is set in one end of the housing 42 facing away from the motor 2 and forms an integral part of the housing 42. The copper block 43 is adapted to tightly fit on and around the rotating shaft 21 of the motor 2, so that the copper block 43 and the housing 42 rotate synchronously when the motor 2 operates. A primary gear 44 having an integral gear push bar 45 at one side is loosely mounted on and around the rotating shaft 21 between the motor 2 and the housing 42. That is, the rotating shaft 21 does not directly rotate the primary gear 44.

Figures 9, 10:
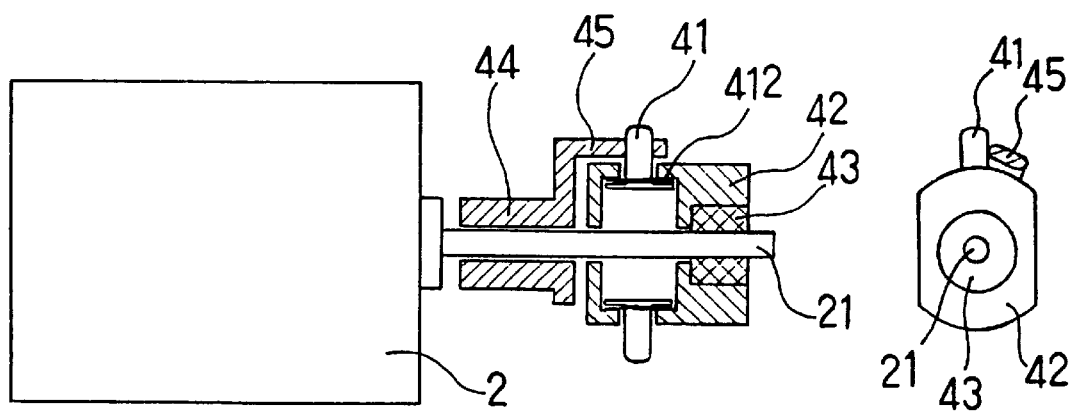
FIG. 9 is a partially sectional view showing the clutch according to FIG. 7 mounted around the motor rotating shaft but in a rotating state.
FIG. 10 is a front plan view of FIG. 9.

When the motor 2 operates, the rotating shaft 21 directly brings the copper block 43 and the housing 42 to rotate along with it at the same time. When the housing 42 rotates at very high speed, a centrifugal force is produced and it is stronger than a tension of the springs 412. As a result, the springs 412 are compressed and the projecting rods 41 are thrown outward by the centrifugal force, as shown in FIGS. 9 and 10. When the projecting rods 41 touch the gear push bar 45, they push the bar 45 and accordingly rotate the primary gear 44 that in turn rotates the secondary gear 36 and the worm 37. The worm 37, as it works in the first embodiment, guides the push rod 5 to move forward or backward to unlock or lock the door.

When the motor 2 is powered off, the projecting rods 41 are located inside the projecting rod chamber in the housing 42, and the primary gear 44 will not be rotated by the rotating shaft 21. If a key is inserted into the lock on the door and turned, the push rod 5 is pushed inward and causes the worm 37, the secondary gear 36, and the primary gear 44 to rotate in reverse direction, the motor 2 is not affected and no counter electromotive force would be produced. And, no resistance due to the counter electromotive force would exist while unlocking the door with a key. Therefore, the gear ratio can be maximized in the present invention to achieve high torque output without the problem of counter electromotive resistance.

Figure 2:
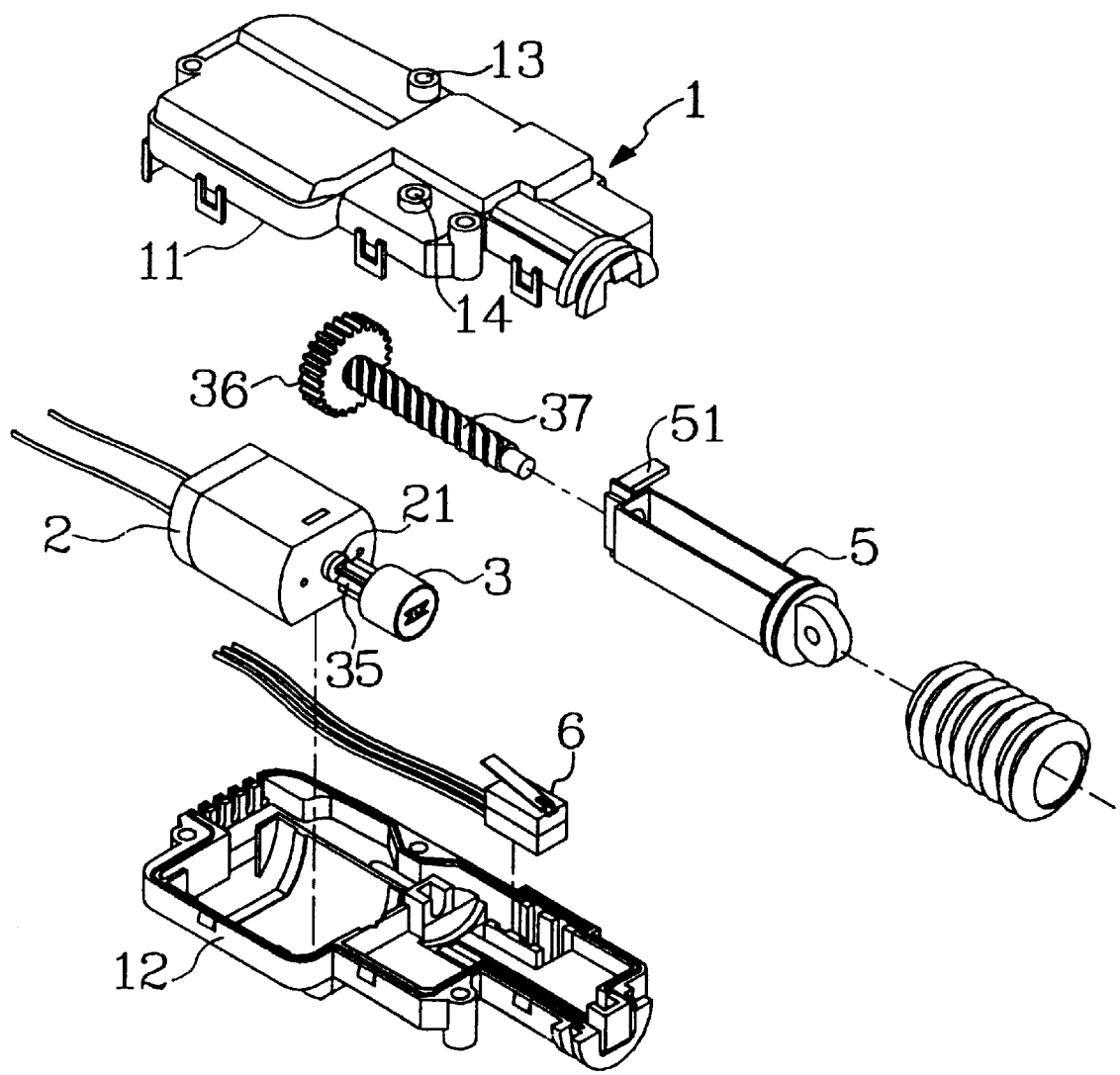
FIG. 2 is an exploded perspective of a clutch-type automotive electric lock according to the present invention.
Figure 7:
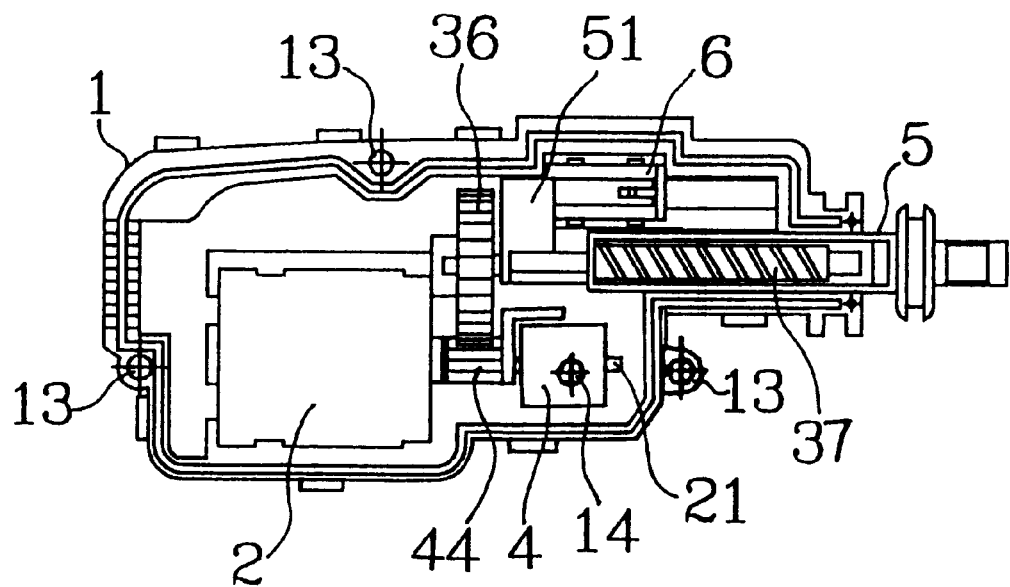
FIG. 7 is an assembled plan view showing another embodiment of the present invention.
Figure 8:
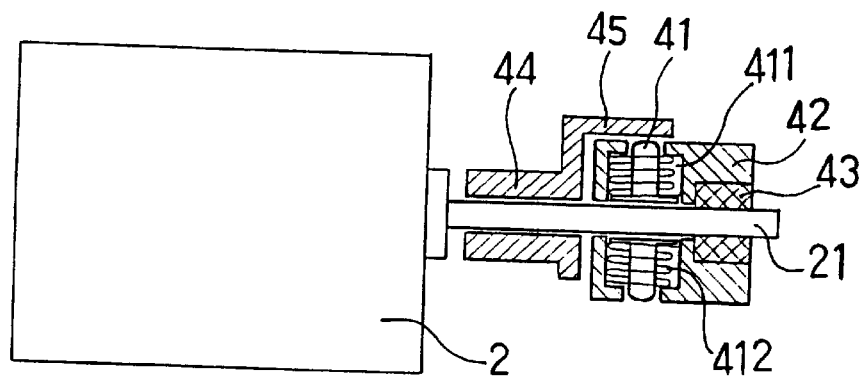
FIG. 8 is a partially sectional view showing the clutch according to FIG. 7 mounted around the motor rotating shaft but in a still state.

Now, please refer to FIGS. 2, 3 and 7 at the same time. The push rod 5 is optionally provided at its inner end with a contact finger 51. And, a microswitch 6 can be provided in the casing 1 at one side thereof corresponding to the contact finger 51, such that the contact finger 51 contacts the microswitch 6 when the push rod 5 reaches a final end in its travel. With the contact finger 51 and the microswitch 6, it can be detected whether the push rod 5 is in an unlocking or a locking position.

For the present invention to be conveniently used on all types of automobiles, the casing 1 may be designed to include an upper cover 11 and a lower cover 12 detachably connected to one another by tenons and mortises or similar fastening means provided along outer edges of the two covers. And, screw holes 13 can be provided on the two covers 11, 12 at corresponding points, which are preferably separately located at front, middle, and rear portions of the casing 1 distributed in a triangle. Moreover, a preformed hole 14 covered with a thin layer of material can be provided on one of the two covers 11, 12. With these triangularly distributed screw holes 13 and the easy-assemble structure of the casing 1, the present invention can be assembled or screwed to all types of automobiles for use.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. An automotive electric lock comprising a casing in which a motor, a clutch assembly having a primary gear connected thereto, a secondary gear having a worm connected thereto, and a push rod are mounted; said clutch assembly being mounted on and around a rotating shaft of said motor, so that said primary gear is driven by said motor to rotate said secondary gear and accordingly said worm; said push rod being associated with said worm and guided by said worm to move forward or backward along said worm when said worm rotates; said clutch assembly further comprising:

a cylindrical housing mounted on and around said rotating shaft of said motor with said primary gear provided at one end of said housing facing said motor to loosely surround said rotating shaft;

a deformable elastic member put in and around said cylindrical housing and defining a generally rectangular shaped expandable hole longitudinally extending the length of said elastic member for said rotating shaft of said motor to extend therethrough;

at least one pair of flexible members disposed in said expandable hole of said elastic member; and a rotational block located in said expandable hole of said elastic member and fixedly mounted on and around said rotating shaft of said motor to press said flexible members against said elastic member;

wherein said elastic member having two inward folding portions symmetrically provided on two diametrically opposite sides of said elastic member and said expandable hole in said elastic member having a generally rectangular shaped cross section, and wherein said flexible members are L-shaped thin metal sheets disposed in said cylindrical housing to face each other and said rotational block is a long copper column having square cross section;

whereby when said motor is off said clutch assembly is loosely mounted around said rotating shaft of said motor and does not produce any resistance to a key used to unlock a door of an automobile onto which said electric lock is mounted, and when said motor is started said rotational block fixedly mounted around said rotating shaft rotates to compress said flexible members and said elastic member, causing said elastic member to deform outwardly and tightly contact with said cylindrical housing, thereby said housing along with said primary gear are driven by said motor to rotate said secondary gear and a torque output by said motor is amplified through a ratio of said secondary gear to said primary gear.

* * * * *